United States Patent
Dahlbacka

Patent Number: 5,823,624
Date of Patent: Oct. 20, 1998

[54] MODULAR HEIGHT ADJUSTABLE VEHICLE SEAT ARMREST

[75] Inventor: Bruce B. Dahlbacka, Port Washington, Wis.

[73] Assignee: Milsco Manufacturing Company, Milwaukee, Wis.

[21] Appl. No.: 889,527

[22] Filed: Jul. 8, 1997

[51] Int. Cl.$^6$ .................................................. A47C 7/54
[52] U.S. Cl. ........................... 297/411.36; 297/411.38; 297/411.32
[58] Field of Search ............................. 297/411.2, 411.3, 297/411.32, 411.35, 411.36, 411.38

[56] References Cited

U.S. PATENT DOCUMENTS

| | | |
|---|---|---|
| 4,097,088 | 6/1978 | Meiller . |
| 4,244,623 | 1/1981 | Hall et al. . |
| 4,400,033 | 8/1983 | Pietsch . |
| 4,828,323 | 5/1989 | Brodersen et al. . |
| 4,951,995 | 8/1990 | Teppo et al. . |
| 5,265,938 | 11/1993 | Melhuish et al. . |
| 5,275,465 | 1/1994 | Gulliver et al. . |
| 5,435,626 | 7/1995 | Lai . |

FOREIGN PATENT DOCUMENTS 2170099  7/1986  United Kingdom .

OTHER PUBLICATIONS 10 enlarged color photos of prior art Milsco Manufacturing Co. armrest described in Background of the Invention section of application ser. No. 08/889,527.

*Primary Examiner*—Milton Nelson, Jr.
*Attorney, Agent, or Firm*—Nilles & Nilles SC

[57] ABSTRACT

A compact and modular armrest having a frame with a pair of spaced apart downturned sidewalls each possessing a slot for capturing a portion of the thumbwheel that receives a height adjuster bolt having one end threaded into a nut anchored to a top wall web interconnecting the sidewalls of the frame and a head at its other end rotatively coupled to the thumbwheel with the bolt head bearing against the free end of a post attached to a bracket pivotally mounting the armrest to a vehicle seat. A retainer ring is secured to the bolt adjacent the head for keeping the thumbwheel and bolt captive to the frame. The ring also limits how far the thumbwheel can slide axially along the bolt head which also limits armrest height adjustment in one direction when the bolt is rotated in one direction. Height adjustment in the opposite direction can be limited by the ring bearing against the anchor nut when the bolt is rotated in the opposite direction. Preferably, height adjustment in the opposite direction is limited by an unthreaded portion of the bolt stem stopping against the threads of the anchor nut. A pad covering the frame also lines at least a portion of each slot for contacting the thumbwheel to dampen vibration and oppose random thumbwheel rotation. During operation, the thumbwheel is manually grasped between the thumb and forefinger of a seat occupant and rotated thereby rotating the bolt to raise or lower the armrest depending upon the direction of thumbwheel and bolt rotation.

35 Claims, 6 Drawing Sheets

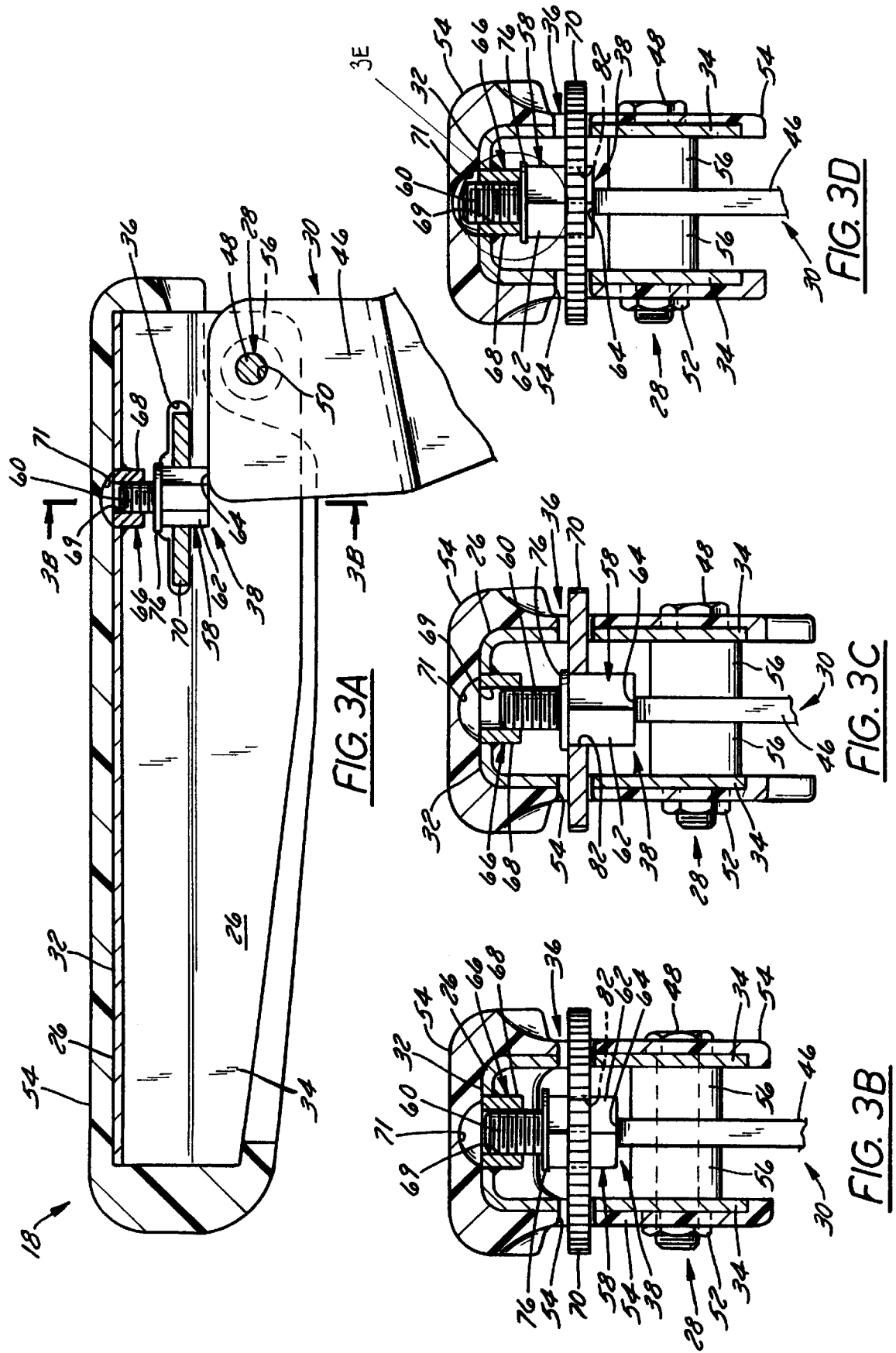

MODULAR HEIGHT ADJUSTABLE VEHICLE SEAT ARMREST

FIELD OF THE INVENTION

The present invention relates to a vehicle seat having an adjustable vehicle seat armrest and more particularly to a modular retrofittable height adjustable armrest.

BACKGROUND OF THE INVENTION

Seats with adjustable armrests are well known. However, most, if not virtually all, adjustable armrests contain so many components that they are not economical to manufacture and assemble, particularly in the United States where wages are relatively high. An example of such a complicated and uneconomical armrest construction is disclosed in Hall et al., U.S. Pat. No. 4,244,623.

Another problem with many known and commercially available height adjustable armrests for office chairs is that the armrest must be grasped from the top and pulled upwardly or pushed downwardly while a button or another activator is depressed, making them poorly suited for use in relatively confined spaces, such as what is typical in off-road vehicle applications. Moreover, many of these types of adjustable armrests are not sufficiently rugged and robust enough to withstand offroad vehicle-type use. Examples of these kinds of armrests include: Teppo et al., U.S. Pat. No. 4,951,995; Melhish et al., U.S. Pat. No. 5,265,938; and Lai, U.S. Pat. No. 5,435,626.

For off-road vehicle applications, many seats manufactured by the assignee herein have an armrest height adjustment mechanism that is hidden from view making it difficult, if not virtually impossible, for a seat occupant to realize that the armrest can be adjusted. The height adjustment mechanism consists of a single metal bolt having one end that is threaded into a web portion that extends between two sidewalls of a metal frame of the armrest and the other end which bears against the top of a metal post attached to an armrest mounting bracket that mounts the armrest to the seat. Because the height adjustment bolt is hidden within the sidewalls of the armrest frame, it is difficult for a seat occupant to be aware that the height of the armrest can be adjusted unless the seat occupant was previously told how to adjust the armrest or read the seat's user manual. Moreover, the bolt is not captive to the armrest, making it relatively easy to completely unscrew from the armrest and become lost leaving a seat occupant not only with an armrest that cannot be height adjusted but one which is thereafter inclined slightly downwardly at an uncomfortable angle.

As a result of this construction, vibration transmitted during vehicle operation from the seat to the armrest height adjustment bolt can undesirably rotate the bolt causing the armrest height to change from its desired setting. Even worse, vibration can cause the bolt to completely unscrew from the armrest thereby resulting in an armrest that can no longer be height adjusted.

In preparation to adjust the seat, the armrest must be lifted about a pivot connecting the armrest to the mounting bracket until the armrest is generally vertical to expose the end of the bolt. The exposed bolt is then grasped or engaged at its end and rotated in one direction to raise the armrest or rotated in the opposite direction to lower the armrest. One drawback of this design is that after rotating the bolt, the armrest must be tilted downwardly toward its generally horizontal operating position so that the seat occupant can determine if the adjusted armrest is located in the desired position. If not, the armrest must be raised and the bolt rotated again. This "hit-or-miss" adjustment process must be repeated until the armrest is adjusted to the desired height.

This rather inexact "hit-or-miss" process is also what is used during manufacturing to level both armrests before shipping the seat. Unfortunately, it can take many such adjustment iterations before both armrests are at the same height, wasting manufacturing steps, time and money.

U.S. Pat. No. 4,097,088 discloses a rather complicated armrest assembly for a seat having an armrest 7 pivotally attached to a supporting lever 4 that can be (a) lifted such that the lever and armrest are generally parallel to the seat cushion 2 or (b) tilted downwardly so they are generally parallel to the seat cushion 2. The armrest assembly is pivotally mounted to a bracket 3 that is immovably affixed to the seat and which has an outwardly projecting abutment 22. The armrest assembly includes a threaded stud 19 that has one end which bears against the abutment and another end that is threadably received in a threaded sleeve 18 of a bracket 14 secured to the armrest support lever 4. The stud has a knurled disc 20 that is manually engaged to turn the stud to raise or lower the armrest indirectly by changing the angle of the armrest support lever.

Unfortunately, the armrest assembly disclosed in the '088 patent is poorly suited for retrofit applications as it is not modular because it requires that the armrest support lever mounting bracket be equipped with a sideways extending outwardly projecting abutment against which one end of the threaded stud can bear when the armrest is in its generally horizontal operative position. This abutment surface also requires relatively precise location relative to the end of the stud. If the stud is bent or the abutment worn or improperly located, the stud can miss the abutment when the armrest is lowered to its horizontal operating position resulting in an armrest that is substantially inoperable and which may become jammed. Additionally, this armrest adjustment assembly has more components than desired requiring more assembly operations making it too expensive for simple and low cost off-road vehicle seating applications. Finally, there is no disclosure of any mechanism for preventing random rotation of the stud resulting in no guarantee that the armrest will not wander from its desired armrest height adjustment setting.

What is needed is a vehicle armrest assembly that is of simple and modular construction making it quick, easy and inexpensive to assemble while also being retrofittable and well suited to low cost off-road vehicle seating applications. What is also needed is an height adjustable armrest that will not wander from its preset desired height adjustment. What is still further needed is an armrest that is quiet, rattle free and of simple construction.

SUMMARY OF THE INVENTION

A height adjustable modular armrest that uses a thumbwheel captured by a retainer on a rotatable height adjuster bolt that has an end which bears against a portion of an armrest mounting bracket and another portion which threadably engages the armrest to raise or lower the armrest by rotation of the thumbwheel turning the bolt. The retainer is fixed to the bolt and also serves as a stop in at least one height adjustment direction to limit how high or how low the armrest can be inclined.

If desired, the retainer can be located on the bolt such that it limits both how high and how low the armrest can be inclined. If the retainer limits height adjustment in both directions, when rotated in one direction, the retainer bears against a threaded anchor nut attached to the frame of the armrest into which the bolt is threaded. When the retainer bears against the anchor nut, it prevents prevent further bolt and thumbwheel rotation thereby preventing further height adjustment in that direction. When rotated in the opposite direction, the retainer is urged tightly against the thumbwheel which resists and prevents further rotation and height adjustment.

Where the retainer limits armrest height adjustment in only one direction, the bolt preferably is constructed and arranged to limit height adjustment in the opposite direction. To accomplish this, the threaded axial length of the bolt is less than the length of the elongate cylindrical stem of the bolt carrying the threads such that the unthreaded portion of the bolt stem adjacent the bolt head engages the internal threads of the anchor nut stopping further bolt rotation and further armrest height adjustment in that direction.

So that a seat occupant can easily raise or lower the armrest, a portion of the thumbwheel extends outwardly from slots in the armrest frame and floats axially on a head of the height adjuster bolt. The thumbwheel is rotatively coupled to the head of the bolt such that rotation of the thumbwheel turns the bolt. More particularly, the thumbwheel is rotatively coupled to the bolt head in a manner that also provides a sliding or loose fit between the thumbwheel and bolt head to permit the thumbwheel and armrest to move up and down relative to the bolt during bolt rotation as the armrest is raised or lowered while also permitting the thumbwheel to move up and down substantially in unison with the armrest.

To help dampen vibration and minimize and help prevent armrest rattling and noise, at least a portion of a flexible and resilient armrest covering or pad overlying the frame extends beyond an edge of one or both slots to directly contact the thumbwheel. To further prevent armrest vibration, noise, and rattling, the thumbwheel is made of a synthetic material, such as a plastic or elastomeric material, that preferably is a high density polyethylene. Contact and friction between the pad and thumbwheel helps prevent the thumbwheel from randomly rotating and wandering from its desired preset height adjustment setting.

The armrest frame has a pair of downwardly extending sidewalls spaced apart by an interconnecting web portion that forms a top wall of the armrest upon which an arm of a seat occupant rests during use. The armrest is attached to the mounting bracket by a pivot that extends through both sidewalls and an upwardly extending mounting post of the bracket. Inside the frame, the anchor nut is attached to the underside of the web and threadably receives the armrest height adjuster bolt.

To permit the threaded end of the bolt to be received beyond the nut, the web of the frame has a through bore generally overlying the threaded bore in the nut. To permit the threaded end of the bolt to extend beyond the top surface of the web to increase the maximum downward stroke or downward amount of armrest adjustment, the armrest pad or covering has a cavity or recess generally overlying the web bore. Preferably, the length of the height adjuster bolt, nut size and other components are selected so that when the armrest is adjusted to its maximum downward position, the end of the bolt does not bear directly against the armrest pad. If the end of the bolt does bear against the underside of the pad, it preferably does not urge the pad upwardly away from the web of the frame thereby preventing any "bulge" from forming on top of the armrest.

While one end is threaded into the anchor nut, the other end of the height adjuster bolt has a head which bears against the free end of the armrest bracket mounting post, the free end of the post serving as an abutment surface. The thumbwheel receiving slot or aperture in at least one armrest frame sidewall is generally aligned with the slot or aperture in the other sidewall for helping to capture the thumbwheel while locating it and the height adjuster bolt relative to the anchor nut.

The thumbwheel receiving slots are located adjacent the mounting post and nut such that when the thumbwheel is received between the slots, a bolt head-receiving opening in the thumbwheel generally underlies the nut and generally overlies at least a portion of the mounting post abutment surface. When received in the slots, the thumbwheel is captive to the armrest frame such that it moves upwardly or downwardly substantially in unison with the armrest frame when the height of the armrest is adjusted. The thumbwheel cannot be slid out of the slots when the height adjuster bolt is inserted through the thumbwheel opening and threaded into the nut carried by the armrest frame.

The thumbwheel opening has a shape that is generally complimentary to the shape of the head of the bolt for rotatively coupling the bolt to the thumbwheel. So that the bolt can rotate to raise or lower the armrest frame while the thumbwheel moves in unison with the frame, the thumbwheel opening and bolt head are constructed to provide the sliding fit between the thumbwheel and bolt head enabling the thumbwheel to telescopically, slidably float along the bolt head in a direction generally parallel to the longitudinal axis of the bolt. In a preferred embodiment, the bolt head is of hexagonal cross section and the thumbwheel opening is of a complementary hexagonal shape for rotatively coupling the thumbwheel to the bolt while permitting relative axial movement between the thumbwheel and bolt head.

To limit the amount of relative sliding movement between the thumbwheel and bolt, the retainer is secured to the bolt and preferably extends radially outwardly from the bolt beyond the bolt head to obstruct or interfere with how far the thumbwheel can slide along the head. The retainer preferably is a generally U-shaped or C-shaped retaining ring having a pair of spaced apart arms with each arm received in a continuous circumferential groove in the unthreaded portion of the stem of the bolt, the groove disposed generally adjacent the bolt head. If desired, each arm can be received between a pair of axially adjacent threads of the threaded portion of the stem nearby the bolt head.

During armrest height adjustment in one direction, as the thumbwheel slides along the bolt head toward the threaded portion of the bolt during rotation, it bears against the retaining ring urging the thumbwheel against a portion of an edge of one or both slots preventing the thumbwheel from further sliding along the bolt head. The interference created between these components prevents further thumbwheel rotation limiting the amount of height adjustment of the armrest preferably in an upward direction. Preferably, the combination of the length of the head, the axial length of the bolt, and the axial location of the retainer on the bolt relative to the bolt head and thumbwheel are selected to determine the maximum amount of upward armrest height adjustment.

Armrest height adjustment is limited in a downward direction by either the unthreaded portion of the bolt stem stopping against the internal threads of the anchor nut or the retaining ring bearing against the anchor nut. Preferably, the combination of the length of the head, the axial length of the threaded portion of the bolt, how far the bolt can extend into and through the nut and web, and the axial location of the retainer on the bolt relative to the bolt head and thumbwheel are selected to determine the maximum amount of downward armrest height adjustment.

To help provide a comfortable surface for an arm of a seat occupant to rest upon, the armrest frame is covered by the pad. To help prevent armrest vibration from reaching the thumbwheel and bolt, pad material preferably lines at least a portion of each thumbwheel receiving slot. The pad and thumbwheel material are also selected to provide a coefficient of friction between them for helping to oppose and preferably prevent random thumbwheel and bolt rotation thereby helping to prevent the armrest from wandering from its height adjustment setting.

In operation, the thumbwheel is manually turned by a seat occupant to rotate the height adjuster bolt. To turn the thumbwheel, the exposed portions of the thumbwheel extending outwardly from the armrest frame sidewalls are manually grasped, preferably between a thumb and forefinger of a seat occupant. As the bolt rotates, it threads into or unthreads from the anchor nut causing the nut to move along the threaded portion of the bolt. As the nut moves, the armrest frame also moves thereby changing the height of the armrest by causing the armrest to rotate about its mounting pivot. As the bolt is rotated, it either raises or lowers the armrest depending upon the direction of thumbwheel and bolt rotation. As the height of the armrest changes, the thumbwheel slides along the bolt head to accommodate the height change.

In this manner, the armrest can be selectively raised by rotating the thumbwheel until the retaining ring bears against the thumbwheel, preferably urging the thumbwheel firmly against the pad material lining one or both slots. The armrest can be selectively lowered until the unthreaded portion of the bolt stem or the ring bears against the end of the anchor nut. In a preferred embodiment of the modular armrest of this invention, clockwise rotation of the bolt lowers the armrest and counterclockwise rotation of the bolt raises the armrest.

Objects, features and advantages of this invention are to provide an armrest of modular construction that can be used without modification as either a right hand or left hand armrest; that uses a single component, the retaining ring, to help keep the thumbwheel captive to the height adjuster bolt while also being capable of limiting upward and downward armrest height adjustment; that keeps captive its height adjustment components advantageously preventing their loss while facilitating shipment of the armrest as a modular assembly ready to be quickly and easily assembled to a vehicle seat; is an armrest of compact construction that is particularly well suited for seats of rather small size and for tight seat packaging applications; is an armrest that can be easily fitted and retrofitted to vehicle seats out in the field; is a height adjustable armrest of quiet and rattle free construction; is a height adjustable armrest that resists wandering from its desired height setting; and is a armrest that is rugged, simple, flexible, reliable, durable, and constructed of a minimum of components, and which is of economical manufacture and is easy to assemble and use.

BRIEF DESCRIPTION OF THE DRAWINGS

These and other objects, features, and advantages of this invention will become apparent from the following detailed description of the best mode, appended claims, and accompanying drawings in which:

FIG. 3A is an enlarged cross sectional side view of the armrest showing in more detail the armrest height adjustment assembly with the armrest in an intermediate generally horizontal operating position;

FIG. 3B is a cross section of the armrest taken along line 3B—3B of FIG. 3A showing the armrest in a generally horizontal position between its fully raised and fully lowered position;

FIG. 3C is a cross section of the armrest taken along line 3B—3B of FIG. 3A showing the location of the components of the armrest height adjustment assembly with the armrest in its fully raised position;

FIG. 3D is a cross section of the armrest taken along line 3B—3B of FIG. 3A showing the location of the components of the height adjustment assembly with the armrest in its fully lowered position;

DETAILED DESCRIPTION OF THE INVENTION

Figure 1:
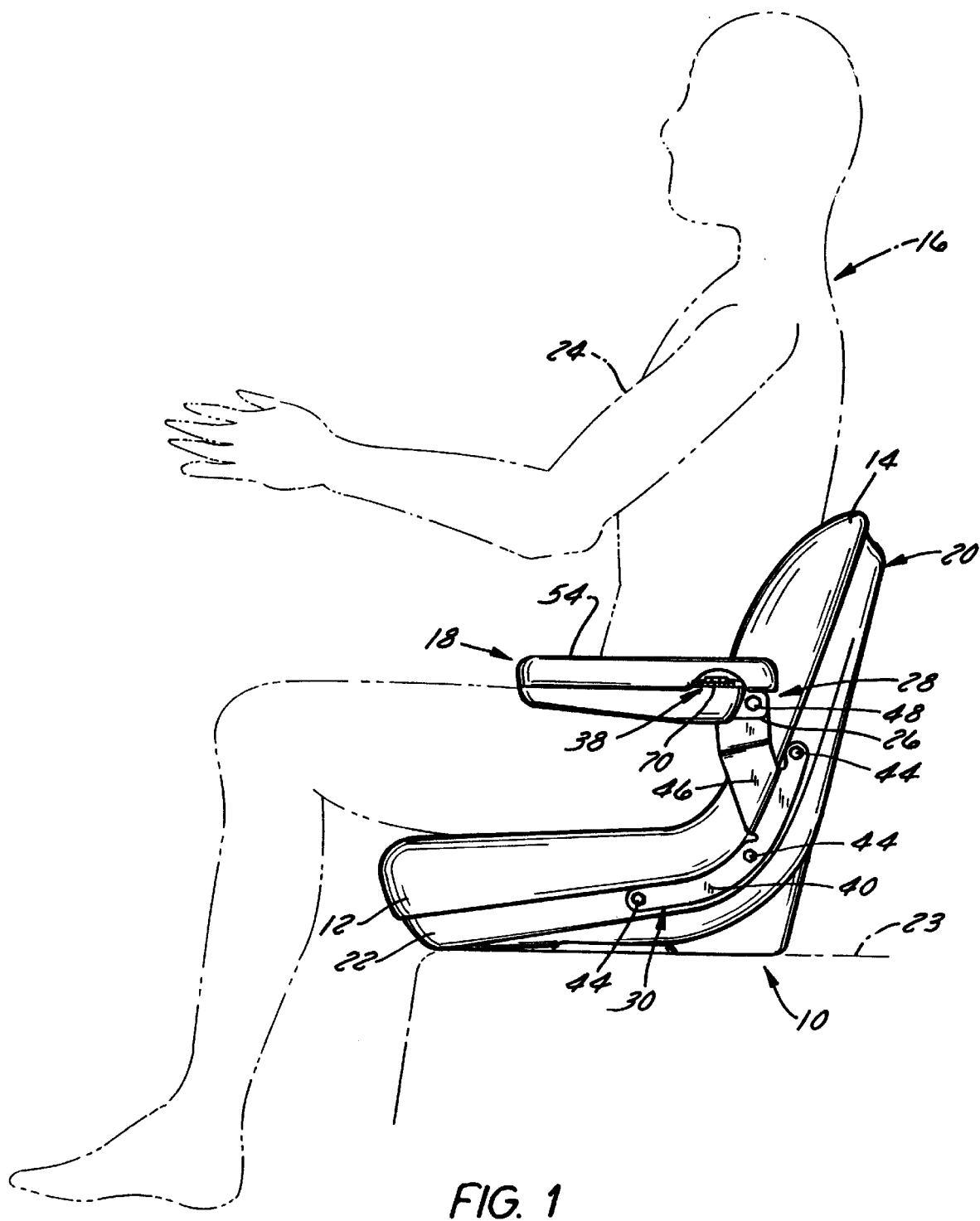
FIG. 1 is a side view of a person sitting in a vehicle seat equipped with a height adjustable armrest of this invention.

FIG. 1 illustrates a vehicle seat 10 having a seat occupant supporting cushion 12 and backrest 14 for receiving and supporting a person 16 (in phantom) sitting in the seat 10 with at least one height adjustable armrest 18 of this invention attached to the seat 10. In one preferred vehicle seat construction, the seat 10 is of unitary construction having a generally rigid frame 20 that can be a one-piece plastic or synthetic shell 22 carrying the seat and backrest cushions 12 and 14. Seat cushion 12 functions as a seat occupant supporting surface 12 for receiving and supporting the buttocks of a seat occupant 16 thereon.

An example of such a vehicle seat 10 is the seat disclosed in U.S. Pat. No. 5,522,645, assigned to the assignee herein, the disclosure of which is hereby expressly incorporated herein by reference. The seat 10 can be carried by a suspension designed to absorb bumps and jolts and is ultimately mounted to the frame or chassis 23 (in phantom) of a vehicle.

To provide support to an arm 24 of the seat occupant 16, the seat is equipped with at least one height adjustable armrest 18 of this invention and preferably is equipped with a pair of such armrests 18 to provide support to each arm 24 of the seat occupant 16. Each armrest 18 includes a frame 26 attached by a pivot 28 to a bracket 30 that is mounted to the seat 10, preferably to the frame 20 of the seat 10.

As is shown in more detail in FIGS. 3A through 3E, the armrest frame 26 is of elongate one-piece construction having an upper central web 32 that spaces apart a pair of downturned frame sidewalls 34, defining a frame 26 of downturned, generally U-shaped cross-section. Each sidewall 34 has an elongate and generally rectangular slot or aperture 36 for receiving and positioning a portion of a novel arm height adjuster mechanism 38 that utilizes a rotatable thumbwheel 70 in a manner permitting easy access to the adjuster 38 so it can be easily manipulated by the seat occupant 16 to selectively adjust armrest height. If desired, the frame 26 can be constructed having only one such slot 36 in one sidewall 34 with one side of the thumbwheel 70 disposed substantially interiorly of the other sidewall 34.

Figure 4:
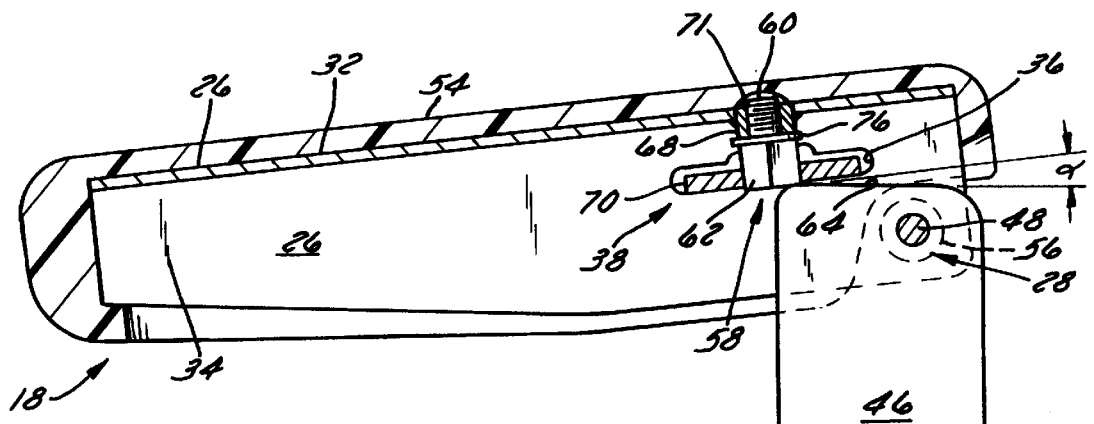
FIG. 4 is a cross sectional side view of the armrest assembly with the armrest in its fully lowered position.
Figure 5:
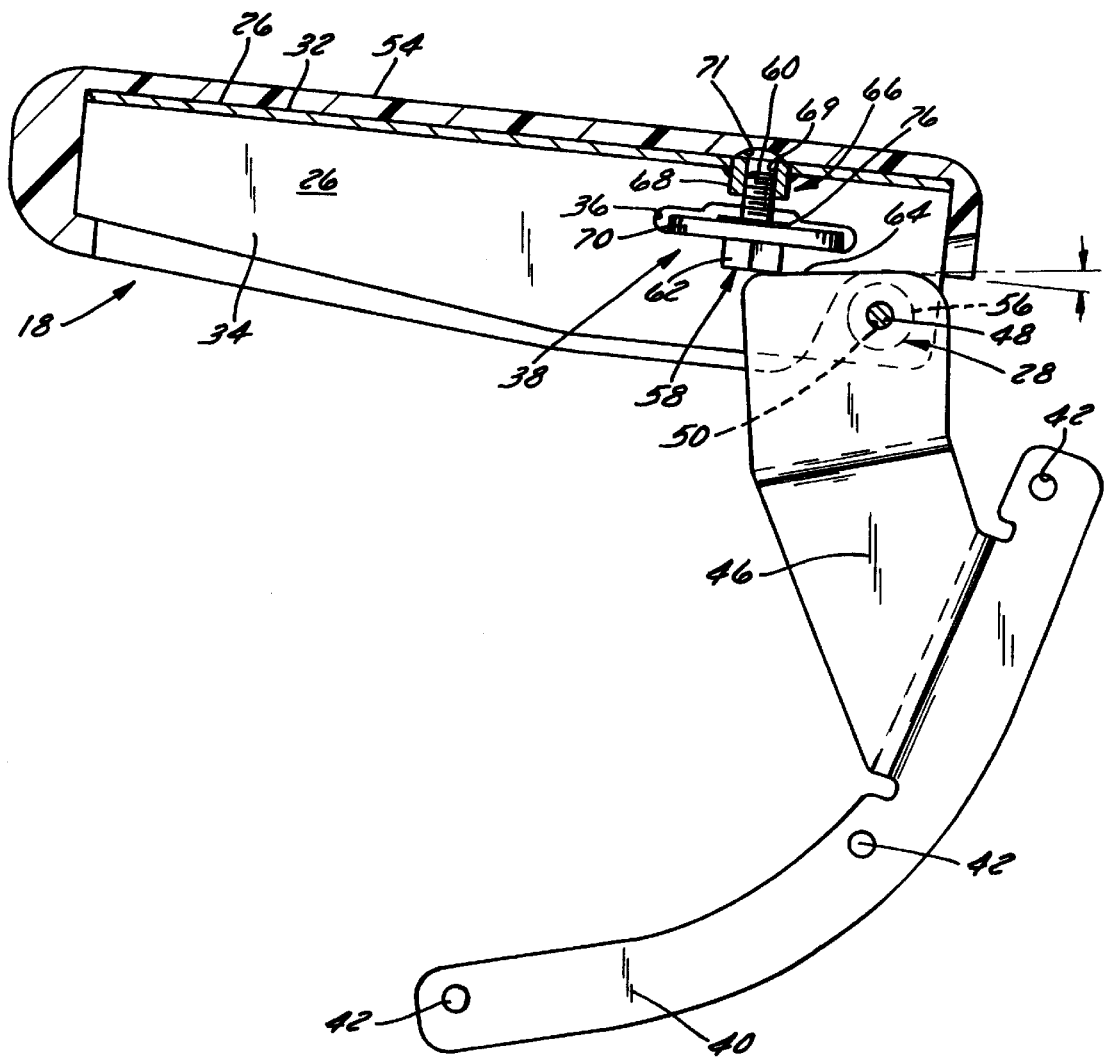
FIG. 5 is a cross sectional side view of the armrest assembly with the armrest in its fully raised position.

As is depicted in FIG. 1 and shown in more detail in FIG. 5, the mounting bracket 30 has a mounting flange 40 that is attached directly to the frame 20 or shell 22 of the seat 10. As is shown in FIG. 4, the flange 40 is shaped to conform to the contour of the side of the seat shell 22. The flange 40 has spaced apart holes 42 (FIG. 5), each for receiving a bolt or screw 44 (FIG. 1) for securing the bracket 30, and thereby the armrest 18, to the seat 10.

Figure 2:
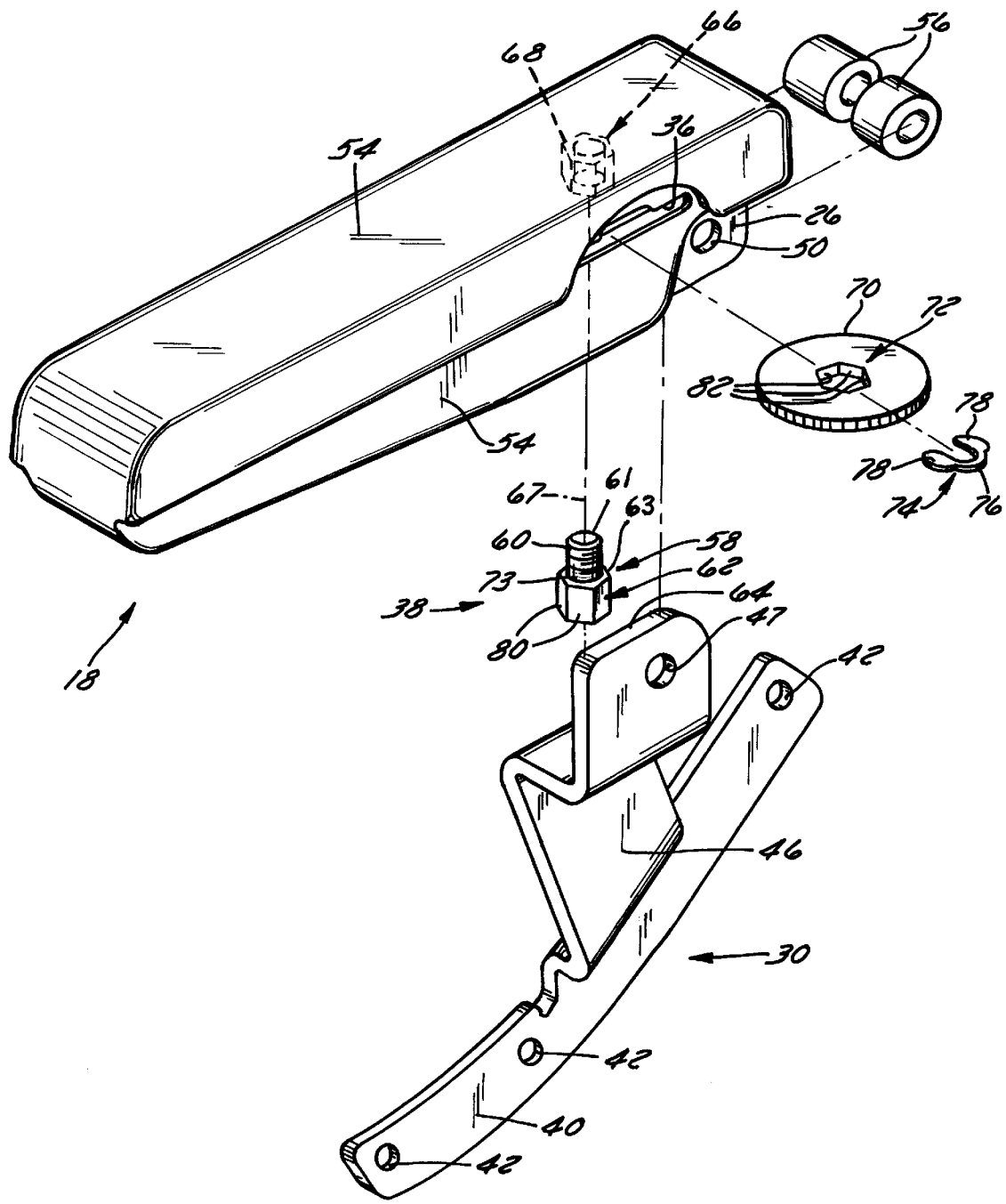
FIG. 2 is an exploded view of the armrest showing components of an assembly which enables the height of the armrest to be adjusted.

Referring to FIG. 2, extending outwardly and preferably generally upwardly from the flange 40 is a mounting post 46 that has a pivot bore 47 located adjacent its free end 64. As is shown in more detail in FIG. 3B, the armrest frame 26 is pivotally connected to the post 46 by a pivot bolt 48 having an at least partially threaded stem which extends through a bore 50 in each sidewall 34 and the bore 47 in the post 46. A nut 52 threaded onto the bolt 48 prevents removal of the bolt 48. The bolt 48 preferably is a hex head bolt.

A lock washer (not shown) can be located between the nut 52 and an outer surface of a frame sidewall 34 to prevent counterrotation of the nut 52 to help prevent the armrest 18 from coming free or loose of the bracket 30. However, the nut 52 preferably is of self-locking construction and preferably is a patch-lock type nut.

Figure 6:
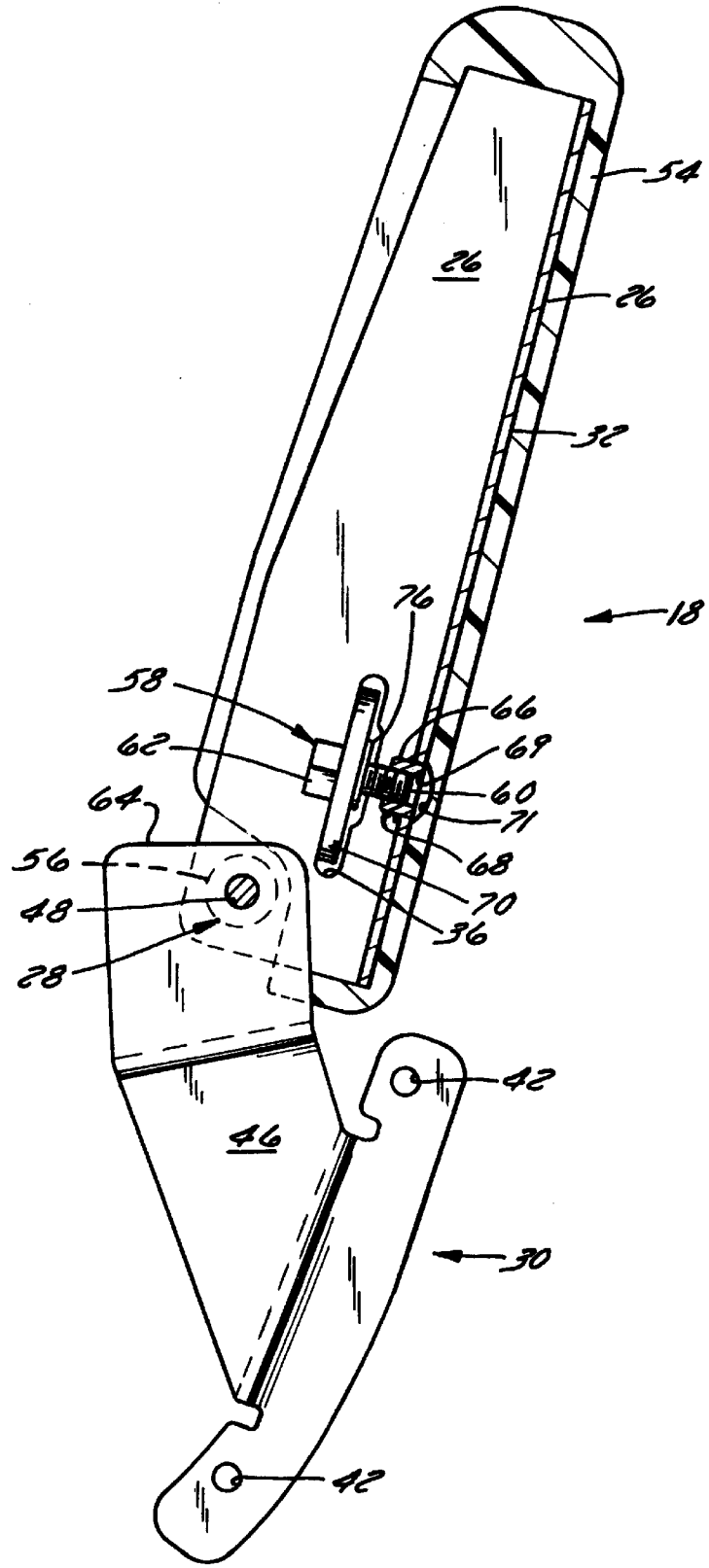
FIG. 6 is a side view of the armrest assembly with the armrest pivoted upwardly in a vertical out-of-the way position.

There are a pair of generally cylindrical and substantially rigid spacers 56 each located between the inner surface of a sidewall 34 and the post 46 to help maintain the generally centered location of the armrest 18 on the post 46. When the armrest 18 is pivotally mounted to the bracket 30 in this manner, the armrest 18 can be swung between its generally horizontal operating position ($\alpha \approx 0°$) shown in FIG. 3A and an out-of-the-way generally vertical position, such as that generally depicted in FIG. 6.

Referring to FIGS. 2, 3A through 3E, the armrest 22 has an exterior pad 54 carried by the frame 26. The pad 54 preferably is constructed of a resilient, durable, comfortable and at least slightly cushioning or compressible material that is comfortable to an arm 24 resting on the armrest 18. Preferably, the pad 54 is constructed of a synthetic material, such as a rubber, a plastic, an elastomeric material, or a natural material, such as cowhide, leather, deerskin, or the like. Preferably, the pad 54 is affixed, fitted, glued to, molded onto, or molded around the frame 26, including substantially all of both sidewalls 34, as is shown in more detail in FIGS. 2, 3A through 3D.

The pad 54 preferably encompasses each slot 36 such that some pad material extends inwardly of the slot 36 preventing the thumbwheel 70 from directly contacting part of a sidewall 34 along an edge of the slot 36 thereby preventing rattling, dampening vibration and ultimately reducing noise. If desired, pad material can substantially or completely line each slot 36.

Additionally, the pad 54 and thumbwheel 70 material are selected to provide friction between them so that the pad 54 opposes thumbwheel 70 rotation thereby preventing the adjuster 38 from wandering away from the adjustment position it is set at, helping to prevent the height of the armrest 18 from undesirably randomly changing or wandering. Preferably, sufficient friction is provided to resist random thumbwheel rotation due to seat vibration, armrest vibration, and the like while still permitting the thumbwheel 70 to be relatively easily manually turned.

Although the thumbwheel 70 can be made of a metal, such as steel, the thumbwheel 70 preferably is made of a synthetic material, such as a plastic, an elastomer, or the like, that helps to provide at least some friction while also inherently dampening vibration so that the armrest 18 is relatively quiet during operation. Preferably, the thumbwheel 70 is made of a thermoplastic that is a high density polyethylene (HDPE) which can be alloyed with glass fiber or another alloying agent capable of increasing its strength, if desired.

The height adjuster 38 further includes a height adjuster bolt 58 having a threaded end 60 (FIG. 2) threadably received in the underside of the frame 26 and a head 62 at its other end, the end of which bears against the free end 64 (FIGS. 2 and 6) or top end 64 of the mounting post 46 when the armrest 18 is in its generally horizontal operating position. As a result of this compact construction, the free end 64 of the post 46 forms an abutment surface 64 against which the end of the head 62 of the bolt 58 abuts when the armrest 18 is located in its generally horizontal operating position (FIGS. 1, 3–5). When the bolt 58 is rotated with the armrest 18 in its generally horizontal position, the armrest 18 either raises or lowers, depending upon the direction of bolt rotation.

The end 60 of the bolt 58 opposite its head 62 is preferably received in a threaded portion 66 of the frame 26 that preferably is an anchor 66 carried by the frame 26 or a portion of the frame 66 constructed and arranged to translate rotation of the bolt 58 into relative movement between the frame 26 and bolt 58 in a direction generally parallel to the longitudinal or major axis 67 of the bolt 58. The lengthwise axis 67 shown in FIG. 2 preferably is also the lengthwise central axis 67 of the bolt 58.

Figure 3E:
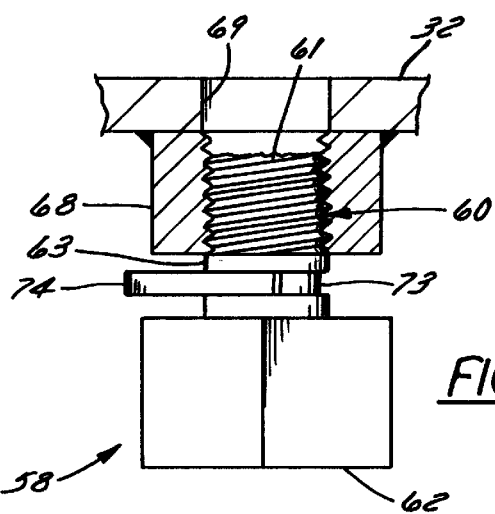
FIG. 3E is a fragmentary enlarged view of that portion of the armrest adjustment assembly encircled in FIG. 3D with parts missing for clarity.

FIG. 3E illustrates in more detail the preferred construction of the height adjustment bolt 58. The stem 61 of the bolt 58 extends outwardly from the head 62 and has one portion 60 which is threaded and another portion 63 between the threads 60 and head 62 that is not threaded. In a preferred embodiment of the bolt 58, the bolt 58 has a length of about 1.1 inches, a stem 61 of a length of about 0.5 inches, a threaded stem portion 62 of a length of about 0.469 inches, a diameter of about 0.38 inches and sixteen UNC threading. The bolt anchor 66 is complementarily threaded for translating relative rotation between the bolt 58 and anchor 66 into up and down movement of the armrest 18 relative to the bolt 58, mounting bracket 30 and seat cushion 12 in a direction generally parallel to the major or longitudinal axis 67 of the bolt 58 thereby enabling the height of the armrest 18 to be adjusted.

To accomplish this, the threaded portion 60 of the bolt 58 is threadably received by a threaded nut 68 that is fixed, such as by a weld, an adhesive or the like, to a portion of the interior surface of the web 32. To relatively accurately locate the head end 62 of the bolt 58 so that it bears against the mounting post 46, the nut 68 generally overlies at least a portion of the free end 64 of the post 46 when the armrest 18 is located in a generally horizontal operating position. To enable the threaded portion 60 of the bolt 58 to be received through the nut 68, the web 32 has a bore 69 generally coaxial with the nut 68. To accommodate that portion of the threaded bolt end 60 that extends beyond the nut 68 and top of the web 32, the pad 54 preferably has a cavity 71 which overlies the bore 69. If desired, the web 32 can be constructed without bore 69 having the nut 68 spaced sufficiently from the underside of the web 32 to permit a suitable range of rotation of the bolt 58 to enable the proper amount of armrest height adjustment.

To enable the bolt 58 to be rotated, the thumbwheel 70 is telescoped over and rotatively coupled to the bolt head 62.

So that rotation of the thumbwheel 70 causes the bolt 58 to rotate, the center of the thumbwheel 70 has an opening 72 of a complimentary profile to the cross sectional profile of the bolt head 62, thereby rotatively coupling the thumbwheel 70 to the bolt 58. To facilitate quick and easy assembly, the head 62 of the bolt 58 and the thumbwheel opening 72 are sized to provide a sliding fit between the two components when the thumbwheel 70 is telescoped over the head 62.

So that rotation of the thumbwheel 70 transmits torque to the bolt 58 to rotate the bolt 58, the opening 72 is constructed to interfere between the head 62 and thumbwheel 70 in a direction (1) generally perpendicular to the longitudinal or lengthwise axis of the bolt 58 or (2) in a direction generally tangent to the periphery of the bolt head 62. In a preferred embodiment, the bolt 58 has a plurality of angled flats 80 defining a hexagonal head 62 and the thumbwheel opening 72 has a plurality of flat surfaces 82 defining a complimentary hexagonal shape. During thumbwheel rotation, the flat surfaces 82 of the thumbwheel 70 bear against adjacent flats 80 of the bolt head 62, typically at and around corners formed between adjacent flats 80 and flat surfaces 82, transmitting force and torque from the thumbwheel 70 to the bolt 58. Of course, the head 62 and thumbwheel opening 72 can have other suitable shapes that enable them to rotatively couple while providing a sliding fit between them.

To help a seat occupant 16 better grasp the thumbwheel 70, the outer periphery of the thumbwheel 70 preferably is grooved, has ridges or is knurled. When received in the armrest frame 26, the thumbwheel 70 has a diameter large enough so that at least a portion of the thumbwheel 70 extends through a slot 36 and outwardly of the frame sidewall 34 and the pad 54 covering the sidewall 34 so that it can be easily engaged by the thumb and one or more forefingers of the hand of the seat occupant 16. As a result of this construction, the armrest 18 is particularly well suited for use with vehicle seats of relatively compact construction that fit in a relatively small space while advantageously still allowing easy access to the thumbwheel 70 to simply, easily, and relatively quickly adjust armrest height.

To help retain the thumbwheel 70 on the bolt head 62 while also helping to capture the bolt 58 and thumbwheel 70 within the armrest frame 26, a retainer 74 is carried by the bolt 58. Preferably, the retainer 74 is a clip or ring 76 received in a groove 73 (FIG. 3E) in the unthreaded portion 63 of the adjuster bolt 58. At least a portion of the retainer 74 extends outwardly beyond the head 62 of the bolt 58, in effect forming a shoulder on the bolt 58, to limit how far the thumbwheel 70 can slidably axially move along the bolt head 62.

In a preferred retainer embodiment, as is shown in more detail in FIG. 2, the retainer 74 is a generally U-shaped ring 76 constructed of a stiff and resilient material, such as preferably, spring steel, stainless steel, another metal, or another suitably stiff and strong material, for capturing the bolt 58 between its arms 78 in a manner that strongly resists removal. In a preferred retainer embodiment, the ring 76 is constructed of spring steel that is at least about forty-two thousandths of an inch thick so that the ring 76 will not bend or break during operation to prevent the height adjuster bolt 58 from completely unthreading from nut 68. A retaining ring 76 of this construction also strongly resists removal from the bolt 58, requiring a substantial amount of force to pull it completely free of the bolt 58.

The spacing between the arms 78 of the ring 76 is such that an interference fit is created between the ring 76 and bolt 58, in effect, clamping the ring 76 to the bolt 58. The size of the ring 76 and its arms 78 is selected so that at least a portion of the ring 76 extends radially outwardly beyond the outer periphery of the head 62 so that it bears against the thumbwheel 70 when assembled to prevent the thumbwheel 70 from sliding off the head 62 and onto the threaded portion of the bolt 58.

Preferably, the ring 78 is received in a groove 73 adjacent the bolt head 62 in a manner such that the ring 78 is fixed axially relative to the head 62 during rotation of the bolt 62. Preferably, the groove 73 is a single, continuous circumferential groove that is spaced slightly axially away from the head 62 and does not communicate with the threads of the bolt 62 to fix its axial location on the bolt 62 in a manner which permits a significant amount force to be applied to the ring 78 in a direction generally parallel to a longitudinal axis of the bolt 58.

In assembly, referring to FIGS. 2, 3A and 3B, the thumbwheel 70 is inserted through an armrest frame sidewall slot 36 with its opening 72 preferably generally overlying the anchor nut 68. Thereafter, from underneath the frame 26 the threaded portion 60 of the bolt 58 is inserted through the thumbwheel opening 72 until it threadably engages the nut 68. As the bolt 58 is brought toward the nut 68, its hexagonal head 62 is telescopically received through the thumbwheel opening 72. With the bolt 58 received through opening 72, the thumbwheel 70 cannot be withdrawn sideways through either slot 36 making the thumbwheel 70 captive to the frame 26.

With a portion of the head 62 received through the thumbwheel opening 72, the retaining ring 76 preferably is secured to the bolt 58. With the thumbwheel 70 seated in slots 36 and the ring 76 engaging the bolt 58, the ring 76 can bear against the thumbwheel 70 which, in turn, bears against the edge of one or both slots 36, capturing the thumbwheel 70 and bolt 58 within the frame 26 whether or not the bolt 58 is threaded into the anchor nut 68. As a result of this construction, the bolt 58 and thumbwheel 70 advantageously remain captive to the armrest 18 at all times after assembly has been completed, whether or not the armrest 18 has been attached to a seat 10.

When the thumbwheel 70 is received in the armrest frame slots 36 and the bolt head 62 inserted into the thumbwheel opening 72, the threaded end 60 of the bolt 58 preferably is sufficiently generally coaxially aligned with the threaded bore of the anchor nut 68 such that it will automatically be threadably received by the nut 68 upon engagement and clockwise rotation of the bolt 58. By this self-threading construction and after the retaining ring 76 has been assembled, the thumbwheel 70 and frame 26 preferably cooperate to always generally coaxially align the threaded end 60 of the bolt 58 with the nut 68 so that the bolt 58 can always easily be threaded into the nut 68 during use and operation.

During assembly of the bolt 58 to the frame 26, the armrest 18 preferably is maneuvered to expose the underside of the frame 26 to permit easy access to the anchor nut 68 thereby facilitating insertion of the bolt 58 through the thumbwheel 70. If the armrest 18 is already attached to a mounting bracket 30, assembly is preferably done with the armrest 18 tipped upwardly generally toward the position shown in FIG. 6.

If not already attached to a mounting bracket 30, the armrest 18 can be attached to the bracket 30 after assembly is completed. After being attached to the bracket 30, the frame 26 can be tipped downwardly toward its generally horizontal operating position shown in FIGS. 3A, 4 and 5 with the head end of the bolt 58 bearing against the free end 64 of the armrest mounting post 46. When assembly is completely finished, the armrest frame 26, mounting bracket 30, and height adjustment components 58, 68, 70 and 76 advantageously form an armrest 18 of this invention of interchangeable modular construction enabling it to be mounted to either a right hand or left hand side mounting bracket 30, its interchangeability helping to minimize manufacturing and installation costs.

While the mounting bracket 30 is shown with a mounting flange 40 constructed for the particular vehicle seat configuration shown in FIG. 1, the flange 40 and means for mounting it to the seat 10 can be modified from that shown and disclosed herein. For example, the flange 40 can be modified to be similar to the flange 40' shown in FIG. 4 or the flange 40" shown in FIG. 6.

Advantageously, the height adjustment components, including the mounting post 46, pivot bolt 48, adjuster bolt 58, thumbwheel 70, retaining ring 76 and frame 26, produce an armrest 18 of this invention that can be assembled in the aforementioned manner while attached to a seat 10 or without being attached to a seat 10. In this fashion, the armrest 18 of this invention can be preassembled and sold as a modular armrest 18, with or without the mounting bracket 30, that can be shipped and thereafter retrofitted out in the field to vehicle seats already equipped with armrests in need of change or even seats not equipped with armrests. Of course, the armrest 18 of this invention can be assembled in the above described manner as a component of a new vehicle seat assembly.

In operation, the armrest 18 is shown in FIG. 3B in an operating position capable of supporting an arm 24 of a seat occupant 16 such that it is located in a generally horizontal position with the top surface of the armrest pad 54 generally parallel to the free end 64 of the armrest mounting post 46. When the thumbwheel 70 is manually engaged and rotated, such as in a clockwise direction, the thumbwheel 70 rotates the adjuster bolt 58 in the same direction threading it further into the anchor nut 68 thereby lowering the height of the armrest 18 relative to the seat occupant supporting seat cushion 12.

The thumbwheel 70 and bolt 58 can be rotated clockwise until the unthreaded portion 63 of the bolt 58 contacts the threads of the nut 68, such as in the manner shown in FIG. 3E, stopping further rotation thereby providing a stop that limits the downward height adjustment of the armrest 18. If desired, the bolt 58, ring 76 and nut 68 can be constructed such that the ring 76 bears directly against the nut 68, such as is depicted in FIG. 4, limiting further bolt rotation and functioning as a height adjustment stop. To do so, bolt 58 can be constructed without an unthreaded stem portion 63 having groove 73 in the threaded portion 62 of the stem.

During thumbwheel rotation, as a result of the thumbwheel 70 being captured by the armrest frame 26 and within the slots 36, the thumbwheel 70 remains generally stationary relative to the frame 26 and pad 54 while the sliding fit between the thumbwheel 70 and bolt 58 enables the bolt 58 to slidably move relative to the thumbwheel 70 in a direction generally parallel to its lengthwise axis thereby allowing the bolt 58 to move relative to the frame 26 to be screwed into or unscrewed from the anchor nut 68 to lower or raise the armrest 18.

Referring to FIG. 4, the axial length of the height adjustment bolt 58, the axial length of its head 62, the axial length of the nut 68, and the location of the retaining ring 76 are all selected to preferably enable the armrest 18 to be tilted downwardly at an angle, α, of at least about seven to eight degrees below a line parallel to the bolt abutment surface 64 of the armrest mounting post 46. In a preferred embodiment of the height adjustable armrest 18 of this invention, α is approximately negative 7.5° (ie. −7.5°) when the armrest 18 is set at its lowest height adjustment position, such as the lowest height position depicted in FIGS. 3D and 4.

To controllably raise the armrest 18, the thumbwheel 70 is rotated in a counterclockwise direction. The thumbwheel 70 can be rotated until rotation of the bolt 58 no longer results in relative movement between the bolt 58 and nut 68. When the bolt 58 has been rotated until there is no more relative movement, the armrest 18 is located at its highest height which is preferably at an angle, a, of between about seven and eight degrees. Preferably, when the armrest 18 is raised to its highest height, a is about positive 7.5° (ie. +7.5°).

During upward height adjustment, the thumbwheel 70 slides along the bolt head 62 until the retaining ring 76 bears directly against the thumbwheel 70 with the ring 76 thereby functioning as a stop that limits upward height adjustment of the armrest 18. When the retaining ring 76 bears against the thumbwheel 70 it preferably urges the thumbwheel 70 against a portion of the armrest sidewall 34 that defines a slot 36. Preferably, the thumbwheel 70 is urged by the retaining ring 76 against an edge of both slots 36, and thus against pad material, helping to limit and generally oppose further thumbwheel rotation.

Because material of the armrest pad 54 lines at least a portion each slot 36, preferably along at least a portion of an edge of each slot 36, the material of the pad 54 also serves to dampen vibration transmitted to thumbwheel 70, retaining ring 76 and adjuster bolt 58 during operation helping to produce an armrest 18 of quiet, rattle free construction. By lining each armrest frame slot 36 with pad material, friction between the pad 54 and thumbwheel 70 preferably helps to maintain the armrest 18 at the desired selected height position by preventing the thumbwheel 70 from wandering during vehicle operation. During operation, gravity and the sliding fit between the thumbwheel 70 and bolt 58 cause the thumbwheel 70 to at least contact some pad material lining a portion of an edge of each slot 36.

It is also to be understood that, although the foregoing description and drawings describe and illustrate in detail a working embodiment of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. An armrest in combination with a vehicle seat comprising:
   a. an armrest mounting bracket attached to the vehicle seat and having an armrest mounting post extending therefrom;
   b. an armrest frame pivotally attached to the post and constructed and arranged to support an arm of a seat occupant;
   c. a threaded bolt having a threaded portion adjacent one end which threadably engages the armrest frame and a head at its other end which bears against the post;
   d. a thumbwheel slidably coupled to the head of the bolt permitting the thumbwheel to move relative to the bolt in a direction generally parallel to a lengthwise central axis of the bolt with the thumbwheel in operable cooperation with the armrest frame permitting the thumbwheel to rotate generally about the lengthwise central axis of the bolt but substantially preventing the thumbwheel from moving relative to the armrest frame in a direction generally parallel to the lengthwise axis of the bolt; and e. wherein rotation of the thumbwheel raises or lowers the armrest frame relative to the mounting post.

2. The armrest of claim 1 wherein the bolt is disposed generally perpendicularly relative to a lengthwise direction of the armrest frame.

3. The armrest of claim 1 wherein the armrest frame has a generally horizontal web portion with a pair of spaced apart sidewalls extending generally downwardly therefrom with at least one of the sidewalls having a slot for receiving a portion of the thumbwheel in a manner that permits a portion of the thumbwheel to extend outwardly beyond the one sidewall while also constraining the thumbwheel in a manner that substantially prevents the thumbwheel from moving relative to the armrest frame in a direction generally parallel to the lengthwise axis of the bolt.

4. The armrest of claim 3 further comprising a pad lining at least a portion of the slot with the pad contacting the thumbwheel to oppose rotation of the thumbwheel.

5. The armrest of claim 4 wherein the pad is carried by the armrest frame.

6. The armrest of claim 5 wherein the thumbwheel is comprised of a high density polyethylene.

7. The armrest of claim 5 wherein the pad comprises a flexible and resilient material.

8. The armrest of claim 7 wherein the armrest frame has an exterior surface and the pad substantially covers the exterior surface of the armrest frame.

9. The armrest of claim 1 wherein the armrest frame has a generally horizontal web portion with a pair of spaced apart sidewalls extending generally downwardly therefrom that each have a slot with the slots generally aligned with each other for receiving a portion of the thumbwheel in a manner that permits a portion of the thumbwheel to extend outwardly beyond at least one of the sidewalls while also constraining the thumbwheel in a manner that prevents the thumbwheel from substantially moving in a direction generally parallel to the lengthwise axis of the bolt.

10. The armrest of claim 9 further comprising a pad covering at least a portion of the exterior of the armrest frame and lining at least a portion of one of the slots for contacting the thumbwheel to dampen thumbwheel vibration.

11. The armrest of claim 9 wherein the web portion of the armrest frame has a threaded portion for receiving and threadably engaging the threaded portion of the bolt.

12. The armrest of claim 9 further comprising a pad covering at least a portion of the exterior of the armrest frame and having a portion extending beyond at least a portion of one of the slots for contacting the thumbwheel to oppose thumbwheel rotation to help prevent the armrest from wandering away from its height setting.

13. The armrest of claim 12 wherein the pad material and material of the thumbwheel are selected to provide a coefficient of friction between the pad material and the thumbwheel so that the pad lining at least a portion of the slot opposes rotation of the thumbwheel when it comes into contact with the thumbwheel.

14. The armrest of claim 13 wherein the pad is comprised of an elastomer and the thumbwheel is comprised of high density polyethylene for dampening vibration and opposing thumbwheel rotation.

15. The armrest of claim 9 wherein the threaded portion of the web portion comprises a nut having a threaded bore fixed to the web portion.

16. The armrest of claim 15 wherein the web portion has a through bore generally coaxially aligned with the threaded bore of the nut for permitting the end of the threaded end of the bolt to be received through and extend beyond the nut.

17. The armrest of claim 16 further comprising a pad covering the web portion of the armrest frame and having a cavity overlying the bore in the web portion for accommodating a portion of the threaded end of the bolt extending beyond the nut and the top of the web portion.

18. The armrest of claim 15 wherein 1) the thumbwheel has an opening of a shape that is generally complimentary to the cross sectional shape of the head of the bolt with the head of the bolt having at least two faces adjoined by a corner therebetween for coupling the thumbwheel to the bolt such that rotation of the thumbwheel rotates the bolt, and 2) the thumbwheel opening is sized slightly larger than the head of the bolt to provide a sliding fit between the thumbwheel and head of the bolt to enable the thumbwheel to move relative to the bolt in a direction generally parallel to the lengthwise axis of the bolt during rotation of the bolt.

19. The armrest of claim 18 further comprising a retainer 1) attached to the bolt between the head of the bolt and an end of the bolt and 2) which is constructed and arranged to limit movement of the thumbwheel relative to the bolt in a direction generally parallel to the lengthwise axis of the bolt.

20. The armrest of claim 19 wherein the retainer comprises a retainer ring constructed of spring steel having a pair of spaced apart arms defining an opening therebetween and wherein the bolt has a groove for receiving each one of the arms therein with said groove disposed adjacent the bolt head and at least one of the arms having at least a portion extending radially outwardly beyond the bolt head so as to bear against the thumbwheel to limit movement of the thumbwheel in an axial direction relative to the bolt.

21. The armrest of claim 20 wherein rotation of the bolt is 1) limited in one direction by the retainer ring bearing against the nut thereby limiting armrest height adjustment in one direction and 2) limited an opposite direction by the retainer ring bearing against the thumbwheel thereby limiting armrest height adjustment in the opposite direction.

22. The armrest of claim 20 wherein 1) the bolt comprises an elongate cylindrical stem having a portion that is threaded and a portion that is not threaded, 2) wherein rotation of the bolt is i) limited in one direction by the unthreaded portion of the bolt stem bearing against the nut thereby limiting armrest height adjustment in the one direction and ii) limited in an opposite direction by the retainer ring bearing against the thumbwheel thereby limiting armrest height adjustment in the opposite direction.

23. The armrest of claim 20 wherein the retainer ring bears against the nut as the bolt is threaded into the nut to limit downward armrest height adjustment and bears against the thumbwheel as the bolt is threaded out of the nut to limit upward armrest height adjustment.

24. An armrest for a vehicle seat comprising:

a. a seat frame carrying a seat occupant supporting surface upon which a seat occupant can sit;

b. an armrest mounting bracket attached to the seat frame and having a generally upwardly extending armrest mounting post with an abutment surface adjacent its uppermost end;

c. an elongate armrest frame pivotally attached adjacent one end to the post enabling the frame to be pivoted about the post between a generally horizontal operating position enabling an arm of a seat occupant to be supported thereon and a position disposed from the generally horizontal operating position, the frame having a central web portion with an interior surface and an exterior surface, the web portion spacing apart a pair of sidewalls that extend generally downwardly from the web portion when the frame is disposed in its generally horizontal operating position, and each sidewall having a slot therein adjacent the post abutment surface with the slot in one of the sidewalls generally aligned with the slot in the other of the sidewalls;

d. a threaded portion carried by the web portion and generally overlying the abutment surface of the armrest post when the frame is disposed in its generally horizontal operating position;

e. a bolt received between the sidewalls and adjacent the web portion, the bolt having a longitudinal central axis, a threaded portion adjacent one end of the bolt with its end threadably received by the threaded portion of the web portion, a head at the opposite end of the bolt which bears against the abutment surface of the post when the armrest is disposed in its generally horizontal operating position, and an unthreaded portion between the head and the threaded portion;

f. a thumbwheel received in the slots in the armrest frame sidewalls with a portion of the thumbwheel extending outwardly from at least one slot for enabling manual engagement therewith to manually rotate the thumbwheel and the thumbwheel having a through-opening constructed and arranged to telescopically slidably receive the head and to rotatively couple the thumbwheel to the bolt such that rotation of the thumbwheel rotates the bolt while permitting the bolt to move axially relative to the thumbwheel during bolt and thumbwheel rotation;

g. a retainer carried by the bolt disposed between the bolt head and the end of the threaded portion of the bolt with the retainer having at least a portion extending radially outwardly from the bolt beyond the bolt head forming a shoulder that limits axial movement of the thumbwheel relative to the head; and h. wherein rotation of the bolt is limited in one direction by the retainer bearing against the thumbwheel thereby limiting height adjustment in the one direction.

25. The armrest of claim 24 wherein the bolt has a head of hexagonal cross section and the thumbwheel opening is of substantially complementary hexagonal shape for rotatively coupling the thumbwheel to the bolt with the thumbwheel opening being slightly larger than the hexagonal bolt head for providing a sliding fit between the thumbwheel and bolt head permitting the head to move axially relative to the thumbwheel.

26. The armrest of claim 24 further comprising a pad constructed of a resilient and generally flexible material overlying the exterior of the armrest frame and extending beyond a portion of each slot contacting the thumbwheel to dampen vibration to minimize armrest noise and resist thumbwheel rotation for preventing wandering of the rotational position of the thumbwheel during vehicle operation.

27. The armrest of claim 24 further comprising a groove in the threaded portion of the bolt located between the head of the bolt and its threaded end wherein the retainer comprises a generally C-shaped ring having a pair of spaced apart arms each of which is received in the groove thereby attaching the ring to the bolt.

28. The armrest of claim 24 wherein said retainer is carried on the unthreaded portion of the bolt and rotation of the bolt is limited in an opposite direction by the unthreaded portion of the bolt bearing against the threaded portion of the web portion thereby limiting height adjustment of the armrest in the opposite direction.

29. The armrest of claim 28 wherein the bolt, the thumbwheel and the retainer are constructed and arranged to allow the height of the armrest frame to be 1) adjusted upwardly as much as 7.5° relative to the generally horizontal operating position and 2) adjusted downwardly as much as 7.5° relative to the generally horizontal operating position.

30. The armrest of claim 24 wherein rotation of the bolt is limited in an opposite direction by the retainer bearing against the web portion thereby limiting height adjustment of the armrest in the opposite direction.

31. The armrest of claim 30 wherein rotation of the thumbwheel and bolt in a clockwise direction lowers the height of the armrest relative to the seat occupant supporting surface until the retainer bears against the threaded portion and rotation of the thumbwheel and bolt in a counterclockwise direction raises the height of the armrest relative to the seat occupant supporting surface until the retainer bears against the thumbwheel.

32. An armrest for a vehicle seat comprising:

a. a seat frame carrying a seat occupant supporting surface upon which a seat occupant can sit;

b. an armrest mounting bracket carried by the seat frame;

c. an abutment surface carried by the seat frame;

d. an armrest frame pivotally attached to the armrest mounting bracket enabling the armrest frame to be pivoted relative to the armrest frame wherein the armrest frame has a web portion and a sidewall that extends generally downwardly with the sidewall having a through-slot that is adjacent the abutment surface;

e. a thumbwheel generally overlying the abutment surface having a through-opening and wherein the thumbwheel is received in the through-slot with a portion of the thumbwheel extending outwardly of the sidewall permitting manual engagement by a seat occupant;

f. a bolt received in the opening in the thumbwheel rotatively coupling the thumbwheel to the bolt for rotation in unison therewith while permitting relative axial movement therebetween and wherein the bolt has one end in rotatable cooperation with the web portion and the other end of the bolt bearing against the abutment surface;

g. a retainer carried by the bolt and extending radially outwardly therefrom forming a shoulder that limits axial movement of the thumbwheel relative to the bolt;

h. a pad lining at least a portion of the through-slot with the pad contacting the thumbwheel to oppose rotation of the thumbwheel; and i. wherein rotation of the thumbwheel in one direction rotates the bolt in the one direction to raise the armrest frame relative to the seat occupant supporting surface and rotation of the thumbwheel in an opposite direction rotates the bolt in the opposite direction to lower the armrest frame relative to the seat occupant supporting surface.

33. The armrest of claim 32 wherein the bolt is disposed generally perpendicular relative to a lengthwise direction of the armrest frame.

34. The armrest of claim 32 wherein the armrest frame has an exterior surface and the pad comprises a flexible and resilient material that is carried by the armrest frame and which substantially covers the exterior surface of the armrest frame.

35. The armrest of claim 34 wherein the thumbwheel is comprised of a high density polyethylene.

* * * * *